Oct. 27, 1931.  A. M. ROSSMAN  1,828,944
ADJUSTABLE SPEED DRIVE
Filed Jan. 31, 1929   2 Sheets-Sheet 1
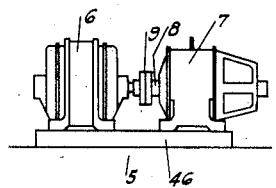
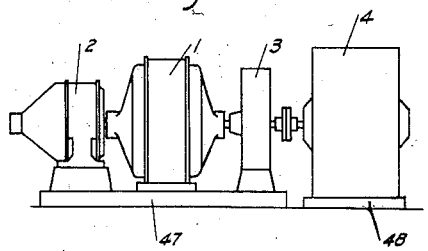
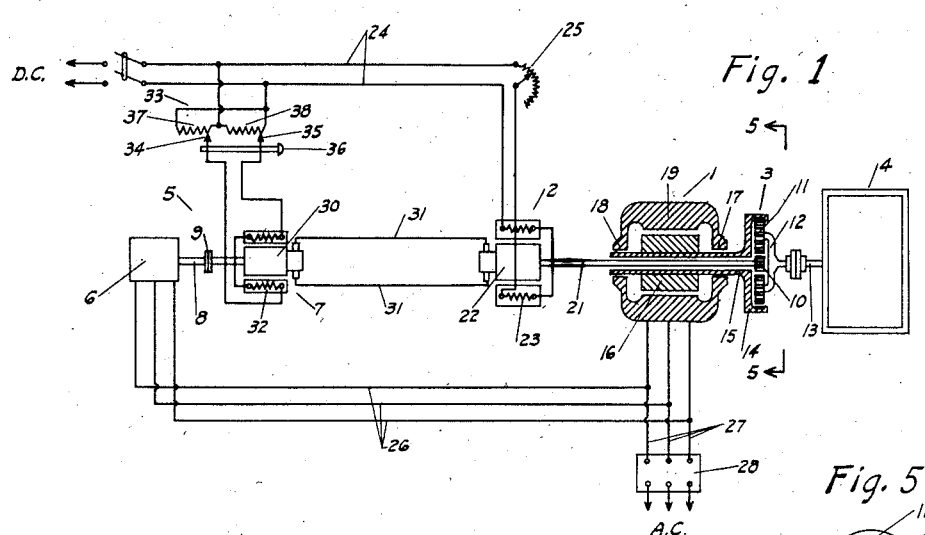
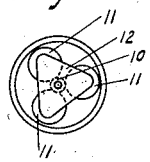
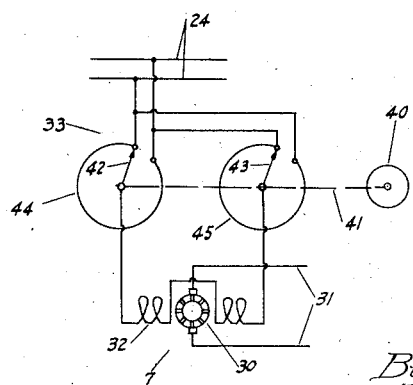
Inventor
Allen M. Rossman Oct. 27, 1931.  A. M. ROSSMAN  1,828,944
ADJUSTABLE SPEED DRIVE
Filed Jan. 31, 1929  2 Sheets-Sheet 2

Inventor
Allen M. Rossman

Patented Oct. 27, 1931

1,828,944

UNITED STATES PATENT OFFICE

ALLEN M. ROSSMAN, OF CHICAGO, ILLINOIS, ASSIGNOR, BY MESNE ASSIGNMENTS, TO ROSSMAN PATENTS, INCORPORATED, OF CHICAGO, ILLINOIS, A CORPORATION OF ILLINOIS

ADJUSTABLE SPEED DRIVE

Application filed January 31, 1929. Serial No. 336,446.

My invention relates to variable speed drives and is particularly concerned with means and method for transforming electrical energy supplied by an alternating current source into mechanical work at a variable speed.

Whereas in the preferred form of the invention the selected speed out of a relatively wide range may be held constant within close limits, it is not necessary within the broad aspects of my invention to hold the speed constant or uniform at a selected value but the essential feature is the ability to vary the speed under suitable control.

In the driving by alternating current of machines involving relatively large amounts of power it is often the case that the optimum speed at which the machine is to be operated or the load to be driven varies over a considerable range. In the known systems of variable speed drive involving electrical control the variation is obtained usually by the wastage of a proportionate amount of power.

There are many situations where the amounts of power involved are quite large and it is highly undesirable to waste any considerable percent of the input. For example, in a power station there are coal grinders or pulverizers, fans, blowers and the like, which consume either intermittently or in the aggregate very considerable amounts of power. At the same time they should be driven at a fairly uniform rate of speed, which rate should be capable of variation within a range of as great as 20 per cent above or below a mean speed.

In my copending application, Serial No. 275,641, filed May 7th, 1928, I have disclosed a variable speed drive involving two elements, namely, a main alternating current motor for supplying the bulk of the power for driving the load and a direct current element for supplying the variable element to add or subtract motion to make up the required speed.

The alternating current motor therein shown is of special design involving the use of a pair of elements each of which is rotatable and the two being capable of common additive or subtractive motion with respect to the load under the influence of the direct current element.

In that construction a differential effect is obtained by the common additive or subtractive motion of the two elements of the alternating current motor. Obviously the direct current motor could have been substituted for the alternating current motor in the said drive, but in such case the interposed machine requires two concentric movable elements and collector rings or moving contacts which are to be avoided.

Also in said drive it is to be noted that the torque relation between the D. C. machine and the A. C. machine and the load is a one to one ratio. This means that the D. C. machine must be a relatively large slow speed machine as compared to the usual size for a corresponding output or horse power.

Now according to the present invention I provide the differential relation between the two motor elements and the load by a mechanical differential. This at once frees the scheme of previous limitations.

First the angular velocity relation of the two motor elements may be within limits anything desired. For example, the gear ratio through the mechanical gear differential may be selected at a value such that the D. C. machine may become a small high speed machine of standard design. Second, the A. C. machine may now become a standard A. C. motor with no moving or rubbing contact (or with moving contacts for starting only) for example, a squirrel cage motor.

Third, the differential gear may be of such form as to provide a flexibility in mounting of the motors and connection of them with the gear and the load. In the preferred form herein shown the motors, the gear and the load may all be disposed in a compact assembly in axial alinement. This, of course, may be varied and is optional.

Fourth, when installed in dust laden atmosphere or in exposed position only the small D. C. motor need to be enclosed. The A. C. motor having no exposed live parts can be of the open type.

The subtractive energy, that is, below synchronous speed of the A. C. motor, is regenerated. The additive energy, that is, above synchronous speed of the A. C. motor, is transformed but that as a maximum is only X per cent of the load where X is the per cent of speed variation with respect to a given mean speed. The capacity of the D. C. motor, that is, its horse power rating to give plus or minus X per cent speed change is only X per cent of the capacity or horse power rating of the A. C. motor.

The gears transmit by rolling action only the additive or subtractive power; hence the loss in the transmission is low. The transmission is reversible.

The use of the differential gear permits of great freedom of design. The form of the gear may be varied widely but the preferred gear herein disclosed takes the form of a planetary gear with two concentric shafts connected to two concentric gears, namely, sun and orbit gears, said concentric shaft being driven by the two motors and a cage having planet pinions meshing with the other gears, such cage being connected to the load.

Whatever form of differential is employed it is desirable to embody not only a differential action but also a mechanical advantage for the D. C. motor.

Now in order to acquaint those skilled in the art with the manner of constructing and operating a device embodying my invention I shall describe in connection with the accompanying drawings a specific embodiment of the same.

Fig. 1 is a diagram of a drive embodying my invention.

Fig. 2 is a diagram of a control rheostat for the D. C. generator.

Fig. 3 is a side elevational view of the motor generator set.

Fig. 4 is a side elevational view of the D. C. machine, the main alternating current motor, the differential gear and the load, all connected together.

Fig. 5 is a detail elevation of the transmission taken on line 5—5 of Fig. 1.

Figure 6:
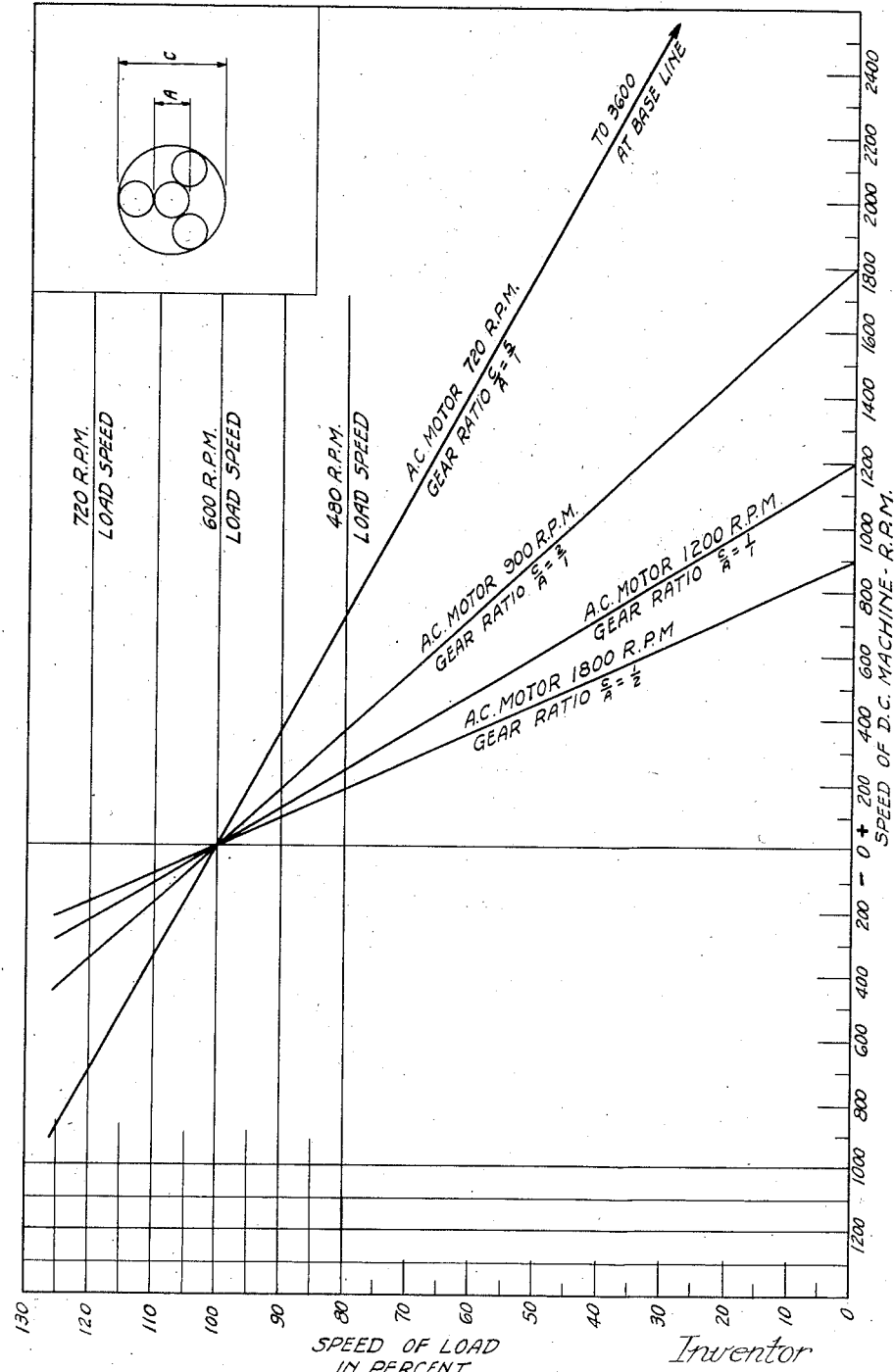
Fig. 6 is a diagram of the interrelation of motor speeds and gear ratios.

Referring now to Fig. 1, the main A. C. motor 1 and the direct current machine 2 are shown as connected to the differential gear 3 which has an element thereof, namely, the idler case 12 connected to the load 4. The motor generator set 5 comprises an A. C. motor 6 and a D. C. generator 7, these two machines being direct connected as by means of shaft 8 including a suitable coupling 9, as shown in the actual embodiment of Fig. 3.

The motor 1 is preferably but not necessarily a squirrel cage motor operating on 60 cycle alternating current. It may be a single phase motor or may operate on any commercial frequency.

The differential gear 3 as shown is a planetary gear comprising a central pinion or sun gear 10 which meshes with a plurality of idlers or planet gears 11 carried by a suitable cage 12. The cage 12 is connected to the load shaft 13 for driving the load 4.

The idlers or planet gears 11 mesh internally with an internal gear 14 which is termed the orbit gear, this orbit gear being connected to the hollow shaft 15 upon which the rotor 16 of the A. C. motor 1 is mounted. The shaft 15 has suitable bearings as at 17 and 18 in the field or stator frame 19.

The A. C. motor is preferably a squirrel cage motor having in the preferred embodiment a single winding which may, however, have taps for securing two different speeds. For the specific purpose herein shown the motor 1 has a substantially fixed speed which is sufficient for the purpose of the load 4 which load is shown as the coal grinder. Obviously the load to be driven determines the speed and power required and the main A. C. motor 1 may be selected accordingly.

The sun gear 10 is connected to a shaft 21 which extends through the hollow shaft 15 and is connected to the armature 22 of the D. C. machine 2. The field 23 of the D. C. machine 2 is constantly excited from a suitable source of D. C. indicated by the supply wires 24. Such source of excitation may be an exciter direct driven by A. C. motor 6. These supply wires may lead to a suitable bus or other source of direct current of substantially constant voltage. The excitation of the field 23 while it is intended to remain constant during the operation of the device may be adjusted to a suitable value as by means of the rheostat 25.

The A. C. motor 6 of the motor generator set 5 is connected in parallel with the main A. C. motor 1 as shown by the leads 26 connected in parallel to the leads 27 of the main motor 1. The leads 27 are in turn connected through a suitable control switch 28, which may be an oil switch, to a source of alternating current preferably three-phase sixty cycle. Obviously single phase A. C. at sixty cycle or twenty-five cycle or any other frequency could be employed, but I prefer the commercial three-phase current.

The D. C. generator 7 has its armature 30 connected directly to the armature 22 of the D. C. machine 2 as by the leads 31, 31 connecting the brushes of the two direct current machines in a closed circuit.

The field 32 of the generator 7 is controlled through a suitable control rheostat 33, which control rheostat is capable of varying the potential and polarity from a maximum in one direction through zero to a maximum in the opposite direction.

As shown, the control rheostat 33 includes a pair of contacts 34 and 35 movable in unison as by the handle 36 to sweep over the rheostats 37 and 38 which are connected in opposite directions to the D. C. supply wires 24.

As shown in Fig. 2, the rheostat 33' may be arranged for rotary operation as by means of a knob or hand wheel 40 connected to a shaft 41, which shaft has radial contact arms 42 and 43 to sweep over the rheostats 44 and 45 which are connected together in opposite direction to the D. C. supply wires 24. Arms 42 and 43 are connected to the field 32 of the D. C. generator 7.

As shown in Figs. 3 and 4, the motor generator set 5 comprising the D. C. motor 6 and the connected D. C. generator 7 may be mounted on a separate base 46 and disposed in any convenient place about the premises. The main power unit shown in Fig. 4 has the main A. C. motor 1, the D. C. machine 2 and the differential gear 3 mounted upon a common base 47 and the load 4 is preferably connected on its own foundation or base 48.

The operation of the system shown in Fig. 1 is as follows:

Assume that the load member 4 is to be driven at 600 revolutions per minute as a normal load speed, but that the speed should be controlled between 480 revolutions per minute and 720 revolutions per minute. The speed of the machines 1 and 2 and the gear ratio in the transmission or differential gear 3 may be varied to secure the desired results. There are a number of solutions possible, but assume, for example, that the A. C. motor 1 has a synchronous speed of 900 R. P. M., that the ratio of the orbit gear 14 indicated by letter C in the diagram at the upper right hand corner of Fig. 6 with respect to the sun gear 10 indicated by the reference letter A in the same diagram in Fig. 6 is 2 to 1. For this the D. C. machine should have a variable speed which will be a maximum of 1800 revolutions per minute when the load speed is zero and the A. C. motor is driving the D. C. motor full speed backward.

Assume that the D. C. machine 2 is under constant excitation, which is its normal condition throughout the range of operation, the A. C. main motor 1 and the motor of the motor generator set are connected to the source of alternating current and are driven at substantially synchronous speed. With the rheostat 33 set to give no excitation on the field 32 of the D. C. generator 7, the armature 30 forms substantially a dead short upon the armature 22 and holds armature 22 against rotation in its field 23. This requires a definite but not large current flow. The rotor 16 of the main A. C. machine now drives the orbit gear 14 and it in turn rolls the cage 12 with the idlers or planet gears 11 about the sun gear 10, transmitting a speed of 600 R. P. M. to the load.

If now the rheostat 33 is moved in a direction to cause excitation of the field 32 in a direction to cause the armature 22 to move in the same direction as the rotor 16 of the A. C. machine, it will be seen that the speed of the D. C. machine is added through the gears to that provided through the gears by the A. C. machine, thereby increasing the load speed to the degree desired.

If the rheostat be moved to reverse the field 32 the electro-motive force generated in the armature 30 will be reversed and the part of the speed of the main A. C. rotor 16 will then be taken up by the rotation of the armature 22 in the opposite direction, with the result that the armature 22 is allowed to become a generator armature and it supplies current to the armature 30 of the D. C. machine 7, causing it to operate as a motor driving the squirrel cage motor 6 and tending to speed it up so as to generate power therein which is returned through the lines 26 to the supply wires 27 of the main A. C. motor 1. In other words, the power which is taken in the D. C. machine 2 to reduce the load speed is regenerated in the motor generator set 6, 7 and is therefore not a loss but is restored to the line. It can be seen, therefore, that the economy of this mode of operation is highly desirable.

By the simple manipulation of the rheostat 33 as shown in Fig. 1 or its equivalent 33' as shown in Fig. 2, any desired speed within the limits prescribed may be attained.

When the field current of field 32 is reversed the D. C. drive machine 2 reverses its direction of rotation. The main D. C. current in lines 31—31 flows in the same direction throughout the complete range of operation and its strength is directly proportional to the torque required to drive the load.

The horse power rating of the D. C. machine 2 needs to be only 20% of the horse power rating of the A. C. motor 1 where 20% speed range in either direction, that is, above or below the normal range of 600 R. P. M. or whatever speed R. P. M. has been selected, is required.

It will be apparent that while I have shown a planetary gear and a planetary gear is simple and effective, other forms of differential gears involving a suitable gear ratio may be employed.

In designing the unit the variables of desired load speed, and speed range thereof, A. C. motor speed, gear ratio, and D. C. motor speed are all to be taken into consideration.

A series of charts for various speed ranges may be prepared and from them a suitable combination may be selected.

While I have shown a shunt machine at 2 this may be a series machine or a compound machine where high starting torque is desired. Also as shown in my copending application, Serial No. 275,641 filed May 7, 1928, the speed range of the combination of motors may be extended by having two speeds of the A. C. motor 1.

The concentric arrangement of the shafts is desirable for certain installations where the motors can be set end to end. However, where the motors are to be set in different positions other shaft and gear arrangements may be employed. For example, the shafts may all be parallel to each other. The transmission, i. e., the gear system should be freely reversible and operate without undue friction.

I do not intend to be limited to the details shown and described as they may be varied.

I claim:

1. In combination, a main alternating current motor, a direct current motor, a load device, a differential gear connecting said motors to said load device, a motor generator set comprising an auxiliary alternating current motor connected electrically in parallel with said main alternating current motor and a direct current generator, said direct current generator having an armature circuit connected in series with said direct current motor and means for controlling the power flowing in said armature circuit to vary the speed and direction of said direct current motor and thereby to vary the speed of the load.

2. In combination, a main alternating current motor, a direct current motor, a load device, a differential gear connecting said motors to said load device, a motor generator set comprising an auxiliary alternating current motor connected electrically in parallel with said main alternating current motor and a direct current generator, the direct current motor having a separately excited field, the direct current generator having a separately excited field and means for controlling the direction and degree of excitation of said generator field, the armature of said direct current motor and direct current generator being connected together in series.

3. In combination, a main alternating current motor, a direct current motor, a load device, a differential gear connecting said motors to said load device, a motor generator set comprising an auxiliary alternating current motor connected electrically in parallel with said main alternating current motor and a direct current generator, said direct current generator and motor being connected in series relation for the circulation of current to transfer power from one to the other selectively, and a control device to control the direction and degree of transfer of power between said direct current motor and generator.

4. In combination, an alternating current motor of substantially constant speed, a separately excited direct current motor, a load device, a differential gear connecting said motors to said load device, and a motor generator set for controlling the speed and direction of drive of the direct current motor.

5. In combination, a source of alternating current, a load shaft, an alternating current motor connected to said source of alternating current and having a driving shaft, a gear driven by said driving shaft, a direct current machine having a shaft, a gear connected to said latter shaft, reversible power translating means for translating alternating current into direct current and vice versa, connected between said source of alternating current and said direct current machine, a controller governing the translating means for governing the direction of flow of power between said translating means and said direct current machine and thereby controlling the operation of the direct current machine as a motor or as a generator, and a differential transmission including the aforesaid gears and being connected to the load shaft.

6. In combination, a source of alternating current, a load shaft, a planet pinion connected thereto, a squirrel cage alternating current motor having a shaft, said motor being connected to the source of alternating current, an orbit gear connected to said alternating current motor shaft, a direct current machine having a shaft, a sun gear connected to said latter shaft, said plant pinion, orbit gear and sun gear constituting a planetary differential gear connection between the alternating current motor, the direct current machine and the load shaft, a direct current generator driven by power taken from said source of alternating current, a reversible field control for said generator, said generator and said direct current machine being connected together in series.

7. In combination, alternating current supply means, a load shaft, an alternating current motor having a shaft, said motor being connected to said alternating current supply means, a direct current machine having a stationary field and an armature with an armature shaft, said direct current machine being a relatively small capacity machine, a motor generator set having an alternating current motor connected to said alternating current supply means and a direct current machine having an armature connected in series relation with the armature of said first direct current machine, said first direct current machine having substantially fixed separate field excitation, means for controlling the direction and strength of the field excitation of the second direct current machine, for controlling the speed and direction of motion of the armature of the first direct current machine and a differential gear for connecting said alternating current motor, said first direct current machine and said load in differential relation with the first said direct current machine working at a mechanical advantage over the alternating current motor with respect to the load, said first direct current machine acting as a motor for speeds of the load above a predetermined speed and acting as a generator to supply current to the motor generator set for speeds of the load below the said predetermined speed.

8. In combination, alternating current supply means, a load member, an alternating current motor having a driving shaft and being connected to said alternating current supply means, a direct current machine having a stationary field adapted for separate substantially constant field excitation and having a rotatable armature with a drive shaft, said direct current machine being of relatively small capacity, means to transform alternating current power from said alternating current supply means into direct current and vice versa, comprising a second direct current machine having a separately excited field, a controller for said latter field for controlling the polarity and strength thereof, said second direct current machine having an armature connected electrically in series with the armature of said first direct current machine, and a differential gear for connecting said load member, said alternating current motor and said first direct current machine reversibly in differential driving relation, the first direct current motor working at a mechanical advantage over the alternating current motor with respect to the load, said first direct current machine acting as a motor for speeds of the load above a predetermined speed and acting as a generator to regenerate a part of the power of the alternating current motor for speeds of the load below the said predetermined speed.

9. In combination, an alternating current supply line, an alternating current drive motor connected thereto, a direct current drive motor, a load device, a differential gear connecting said motors to the load device, a direct current generator, means operating said direct current generator at substantially constant speed for transfer of power between the direct current generator and the alternating current supply line, said generator having an armature circuit connected in series with the direct current motor, and means for controlling the polarity and voltage of the direct current generator to control the speed and direction of said direct current motor and thus to control the speed of the load.

In witness whereof, I hereunto subscribe my name this 19th day of January, 1929.

ALLEN M. ROSSMAN.